United States Patent
Bradley

[11] 3,959,567
[45] May 25, 1976

[54] METHOD AND APPARATUS FOR MAKING LAMINATES

[75] Inventor: Arthur Bradley, Floral Park, N.Y.

[73] Assignee: Surface Activation Corporation, Westbury, N.Y.

[22] Filed: Sept. 12, 1974

[21] Appl. No.: 505,454

[52] U.S. Cl. ............................ 428/461; 156/272; 156/274; 156/306; 156/380; 156/497; 156/555; 264/83; 428/483; 428/500
[51] Int. Cl.² ................. B29C 27/02; B32B 27/06; B32B 31/08
[58] Field of Search ........... 156/272, 306, 274, 244, 156/380, 497, 555; 427/38–40; 428/461, 462, 483, 500; 250/325; 264/83

[56] References Cited
UNITED STATES PATENTS

| | | | |
|---|---|---|---|
| 2,897,109 | 7/1959 | Voigtman | 156/164 |
| 3,018,189 | 1/1962 | Traver | 156/272 |
| 3,067,119 | 12/1962 | Ramaika | 156/272 |
| 3,077,428 | 2/1963 | Heuser et al. | 428/461 |
| 3,188,265 | 6/1965 | Charbonneau | 156/306 X |
| 3,339,234 | 9/1967 | Utz | 156/244 |
| 3,360,412 | 12/1967 | James | 156/272 X |
| 3,578,527 | 5/1971 | Sakata et al. | 156/244 |
| 3,823,061 | 7/1974 | Frayer et al. | 156/272 X |

*Primary Examiner*—William A. Powell
*Assistant Examiner*—M. G. Wityshyn
*Attorney, Agent, or Firm*—Edgar N. Jay

[57] ABSTRACT

Process and apparatus for bonding shaped members without the use of an adhesive, comprising the steps of exposing the surfaces to be bonded to the low energy particles of a gas discharge plasma just before and substantially simultaneously as the members are brought together into intimate face-to-face contact; heating the members; and then compressing the heated members together. The process is applicable to bonding a thermoplastic resin such as polyethylene or ethylene-vinyl acetate copolymer to a wide variety of materials including cellophane, polyester or aluminum foil.

39 Claims, 3 Drawing Figures

METHOD AND APPARATUS FOR MAKING LAMINATES

BACKGROUND OF THE INVENTION

This invention relates to the bonding of shaped members and, more particularly, to the bonding of shaped members without the application of an adhesive between or to either of the surfaces to be bonded.

The method of the present invention is especially well suited for use in bonding shaped members in the form of sheets or films, one of which comprises a thermoplastic resin such as polyethylene or ethylene-vinyl acetate copolymer (EVA). To avoid ambiguity, the process by which two members, for example, extended sheets or films are bonded together will be termed "lamination" and the product formed thereby will be referred to as a "laminate". When a laminate is formed in accordance with the lamination process of the present invention, the bond is effected without a third substance — that is to say, no adhesive is used — and such a lamination process is herein referred to as "dry lamination".

In accordance with conventional lamination practice, an adhesive is applied to one or both of the members to be bonded together. To be commercially desirable, the adhesive utilized should be effective in thin layers; it should be colorless and transparent; and it should be indefinitely stable and resistant to extremes of temperature. Such processes and the products produced thereby leave much to be desired. Adhesives which embody the desired properties are relatively expensive, usually costing substantially more than the materials to be bonded. The adhesive bond strength is not readily, if at all, controllable and when a bond is required which is to be separated at an appropriate time, what often results are laminates that either cannot be separated without destroying them or the bond fails prematurely.

U.S. Pat. No. 3,188,265 relates to a known dry lamination process for making polyethylene-polyester laminates. Instead of an adhesive such as nitrocellulose, the process of that patent utilizes ultraviolet radiation to bond a layer of polyethylene which has been extruded onto polyester stock. It is believed that the ultraviolet radiation is effective in that system because of a unique combination of an ultraviolet radiation-transparent layer (polyethylene) on an ultraviolet radiation opaque layer (polyester). The UV radiation passes through the polyethylene layer but is substantially completely attenuated when it reaches the polyester layer, thereby releasing all of its energy in an interface region of molecular thickness. The result is a hardened, or cross-linked but transparent inner film a few molecular layers thick which serves to bond the polyethylene and polyester layers together. While the process of the U.S. Pat. No. 3,188,265 provides a laminate without requiring the presence of an adhesive it has certain drawbacks. High power UV lamps are not only expensive but their use requires that careful measures be taken to ensure the safety of personnel. Effective shielding is required. Ozone and nitrogen oxides must be removed from the area and equipment must be made of materials which are not rapidly degraded by the unwanted by-products of the radiation process, e.g. ozone and nitrogen oxides, when it is carried out in air.

From U.S. Pat. No. 3,018,189 it is known to expose a polyethylene body to an electrostatic or corona discharge to improve the adherence of printing inks and other such coating materials to the surface of the polyethylene body. That patent also states that to render the plastic films [polyethylene] or laminae receptive to the adhesive, each of the films to be bonded is first exposed to the corona discharge and then adhesive is applied to one or both of the treated surfaces to be joined. The thus treated films or laminae are then to be brought into contact with each other, with the adhesive and treated sides together.

U.S. Pat. No. 3,360,412 relates to a dry lamination process wherein at least one of the surfaces to be bonded is a thermoplastic film which is exposed to an open flame or electrical discharge and then subsequently is brought into contact with a dissimilar material while the latter is at least at a temperature equal to the fusion temperature of the thermoplastic film. A drawback of this process is that the thermoplastic material is heated to or above its fusion temperature so that it is at least in a semifluid condition, thereby making the material likely to curl or shrivel.

U.S. Pat. No. 3,823,061 describes a dry lamination process wherein the films to be bonded are treated with an electrical corona discharge. The patent relates to a corona treatment in ambient air which is accomplished by passing the laminae between an electrode pair or an electrode and a roller at some time before the laminae are compressed together.

SUMMARY OF THE INVENTION

In accordance with the present invention dissimilar materials are bonded together to provide a unique combination of properties which are especially well suited for use in the packaging of a wide variety of products including foods which are to be cooked while packaged. The dry lamination process of the present invention and the apparatus for carrying out the same not only facilitate the lamination of a wide variety of dissimilar materials but also permit a unique degree of control over the strength of the bond forming the laminates. Unlike the laminates of polyester film and polyethylene of the U.S. Pat. No. 3,188,265 which after being irradiated by UV can never be separated without destruction of the laminate, the process of the present invention provides unique control over the surface-to-surface adhesion of the dissimilar materials forming the laminate so that polyester/polyethylene laminates are now provided which can be separated when that is desired.

It is, therefore, a principal object of the present invention to provide an improved dry lamination process and apparatus for carrying out the same.

Another object of this invention is to provide a dry lamination process which affords a unique degree of control over the laminates produced thereby particularly in the ease with which the strength of the bond formed between the surface of the sheets or films forming the laminate can be varied.

A more specific object is to provide such a process in which the combined effects of controlled exposure to a gas discharge plasma and to heat are utilized to provide a laminate in which the opposed surfaces are bonded directly one to the other without the use of an adhesive or third member, and in which the laminate has a predetermined bond strength.

In carrying out the lamination process of the present invention, the dissimilar materials to be laminated are exposed to a gas discharge plasma and heat and while heated are maintained in good face-to-face contact. In a preferred embodiment of this invention, the materials to be laminated are activated by exposing the surfaces thereof to be bonded to a gas discharge plasma and then immediately bringing those surfaces into intimate face-to-face contact by compressing them together whereupon they are heated. Temperature and the power dissipated in the discharge as well as the rate of feed, or exposure time, affect the bond formed between the materials making up the laminate and are controlled to provide the desired bond strength.

BRIEF DESCRIPTION OF THE DRAWINGS

Further objects as well as advantages of the present invention will be apparent from the following detailed description of preferred embodiments thereof and the accompanying drawings in which.

DESCRIPTION OF PREFERRED EMBODIMENTS

Figure 1:
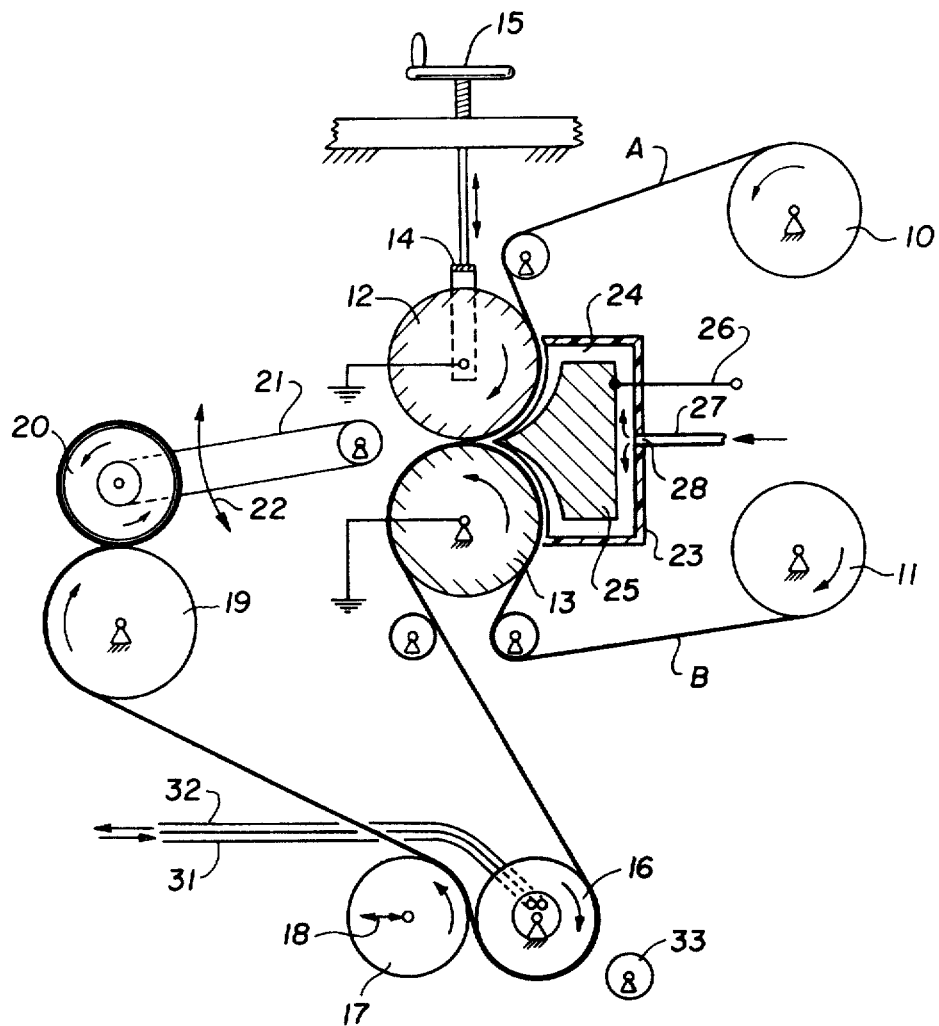
FIG. 1 is a diagrammatic view partially in elevation of an apparatus for carrying out the process of the present invention.

An essential feature of this invention resides in that the surfaces of the materials to be laminated are activated before they are brought together and this activation must be carried out by exposing the surfaces to be contacted to the low energy particles of a gas discharge plasma just before and substantially simultaneously as the materials are brought together. Particle energies of the gas discharge plasma used in carrying out this invention are less than about 15 eV, too low to penetrate the surfaces of any abiding materials to be laminated. In accordance with the best mode known for carrying out the present invention, the surfaces of the materials to be bonded together to form the laminate are brought together in good face-to-face contact and heated while in contact, and substantially simultaneously as the surfaces of the materials are brought into contact, they are exposed to the gas discharge plasma.

A gas discharge or a gas discharge plasma zone is established preferably so that ions and other excited species of the gas discharge activate the surfaces of the two materials immediately before and as they are brought together. In a continuous process for laminating sheets or films, the use of compression rollers for feeding and bringing the materials into contact provides an advantageous arrangement for providing good surface-to-surface contact. So long as good face-to-face contact is provided, the amount of pressure applied to the materials is not at all critical and can vary from very little or virtually zero to short of forces which would permanently deform the materials.

The gas discharge can be at atmospheric pressure or if desired less than atmospheric pressure can be used. In a continuous, relatively high speed process for bonding materials to form laminates it is advantageous to operate at atmospheric pressure, or where a preferred atmosphere is used, a pressure somewhat greater than atmospheric is most advantageous, particularly in that the over-pressure tends to keep air out of the discharge space. Electrical discharges in air can be used to provide a useful plasma for activating the surfaces to be bonded, but an inert atmosphere such as helium or nitrogen or best yet, argon, has important advantages. The nitrogen oxides and ozone formed by a discharge in air are harmful to personnel and equipment, thereby requiring special precautions to be taken. In addition, much higher voltages are required to initiate and sustain a discharge in air. For example, the voltage required to initiate breakdown in argon is about one half that required in air. Confinement of the discharge to a desired location is facilitated by operation at the lower voltages so that by maintaining argon or helium or other gas atmosphere which requires a voltage substantially lower than air, the gas discharge is confined to the zone where the atmosphere is maintained, and the surrounding air functions as an insulator thereby significantly simplifying effective insulation of the equipment.

As is well known, the breakdown voltage not only varies with the specific atmosphere but also with the pressure and the spacing of the electrodes. In any event, the voltage at which the process is carried out is not critical and can vary from several hundred volts or less to several thousand volts in the case of air at atmospheric pressure. With the equipment used in carrying out the method of the present invention discharge voltages of from about 700 to 10,000 volts could be maintained. Nevertheless, the particles in the gas discharge plasma have energies less than 15 eV and serve to activate the surface of at least one of the two materials to be bonded in forming the laminate. Variations in the exposure of the surfaces to the gas discharge plasma can affect the strength of the bond formed between them. Generally stated, the current in the area of the materials covered by the gas discharge plasma may vary from about 0.1 milliampere (ma) per square inch to about 10 ma per square inch and preferably about 0.3 ma to about 3 ma/sq. in. While larger currents can be used there does not appear to be any advantage to be gained from increasing the discharge current above the values stated, and there is increasing risk of damage to the materials being treated.

Best results in carrying out the present process are attained by heating the gas discharge-activated materials while they are maintained in good face-to-face contact. The maximum temperature that can be used must be lower than the melting point of the lower melting component of the laminate being formed. When the activated materials are passed between two rollers, one of which is heated, the higher melting component is preferably on the side in contact with the heated roller. The temperature to which the roller is to be heated will vary with how long the materials remain in contact with the heated roller. The desired temperature is readily determined for each combination of materials and the equipment being used. The temperature to which the roller is heated is limited by the softening temperature of the lower melting component because it is not desired that the materials undergoing bonding be permanently deformed. On the other hand, the minimum temperature to be used will be determined by the strength of the bond desired. With too little or no heat, the bond formed between materials such as polyester and polyethylene which normally are not heat sealable to one another is not strong enough for practical purposes. Above the minimum temperature required to provide a useful bond and below that at which one of the component materials becomes too soft, the temperature can be varied to provide a bond having a desired degree of strength.

To facilitate formation of a good bond between the materials undergoing lamination, it is advantageous to compress the activated and heated materials together. This serves to ensure good face-to-face contact between the two materials, perhaps by eliminating gas which might otherwise be trapped between the two contacting materials or by increasing the number of activated sites on the two which are brought into interacting relation to form bonds. The amount of force applied is not critical, but excessive force which would tend to permanently deform the heated materials should not be used. Variation in the amount of force applied in compressing the two materials together once they are in good contact does not seem to have any significant effect upon the strength of the bond formed between them.

Referring now to the drawings, an apparatus constructed in accordance with the present invention suitable for carrying out the present process comprises supply rollers 10 and 11 for films A and B respectively, which are fed over juxtaposed rollers 12 and 13 at least one of which may be movably mounted so that rollers 12 and 13 can function as compression rollers. In this instance roller 12 is rotatably mounted in a yoke 14 which can be moved toward or away from roller 13 by crank 15 and thereby vary the nip and the compression between them. Preferably, rollers 12 and 13 are covered with rubber or a similar elastomer to ensure even compression. Films A and B are forced into good face-to-face contact at the nip of rollers 12 and 13 and then are led over heated roller 16 through the nip formed between roller 16 and backup roller 17, the latter being movably mounted relative to roller 16 as indicated by arrow 18 so that compression forces exerted on the heated films A and B can be adjusted to ensure good contact between the heated films without damaging them. The laminate made up of films A and B bonded directly to each other is accumulated on take-up roller 20 which is preferably driven by drive roller 19 which engages the laminate being wound on take-up roller 20, thus maintaining a substantially constant tension on the laminate and the films A and B. Roller 20 is swingably mounted on arm 21 as indicated by arrow 22 so that it can maintain contact with the drive roller 19.

Roller 16 can be heated in any convenient manner. As shown, the interior of roller 16 is connected to a source of heating medium such as oil by conduits 31 and 32. A reversing roller 33 is conveniently provided adjacent to heated roller 16 to facilitate placing the higher melting component in contact with the heated roller 16. The remaining rollers are provided as desired to define the feed paths of the films and the laminate produced therefrom.

An enclosure 23 is provided adjacent to the rollers 12 and 13 on the input side of the nip between them. The enclosure 23 has end flaps 24, only one of which is shown in the drawings, the edge of each of which presented to the rollers conforms closely to the curvature thereof and is closely spaced thereto confine the gas medium provided within the enclosure. Enclosure 23 and end flaps 24 are constructed of suitable insulative material.

As shown in FIG. 1, a high voltage electrode 25 is insulatively mounted within the enclosure 23 and is connected by lead 26 to the high voltage side of a variable power supply (not shown). The sides of electrode 25 presented toward rollers 12 and 13 are preferably concave. As shown in FIG. 1, the spacing between the electrode and the rollers is not maintained constant but rather is increased in the direction away from the nip of the rollers. One advantage of such a configuration is that the extent of the discharge circumferentially relative to the rollers 12 and 13 can be readily controlled by adjusting the voltage.

Connected to an inlet 28 of enclosure 23, is a conduit 27 which is connected to a source of the desired gaseous medium under pressure (not shown) when an atmosphere other than air is used.

Figure 2:
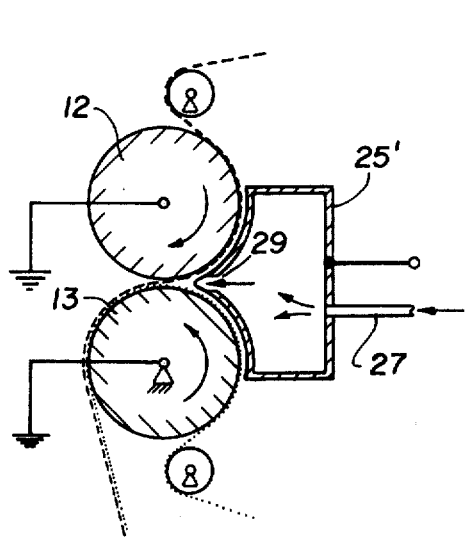
FIG. 2 is a similar view showing a modified form of high voltage electrode juxtaposed to the nip between the two feed rollers.

It is to be noted that the configuration of the high voltage electrode can be varied. For example, instead of being shaped to provide a progressively increasing gap between it and the rollers 12 and 13, the electrode can be shaped so as to provide substantially constant spacing between itself and each of the rollers 12 and 13 and over substantially the entire discharge area as shown in FIG. 2 where electrode 25' is advantageously formed as a hollow body with a slot 29 formed therein providing communication between its interior and the closely juxtaposed nip between rollers 12 and 13. The enclosure for restricting escape of the gas is readily provided by end flaps made of insulative material such as plastic sheet cut to conform to the curvature of the rollers 12 and 13 and mounted from the electrode 25'. With such a configuration, it is advantageous to feed the gas from conduit 27 into the electrode 25' from which it passes through slot 29 at the point of closest approach to the nip between rollers 12 and 13.

In both the arrangement shown in FIG. 1 and that shown in FIG. 2, the electrode 25 or 25' is located equidistant from each of the rollers 12 and 13 and with electrodes 25 or 25' energized each of the rollers 12 and 13 is grounded. Also, the gas fed into the enclosure 23 or electrodes 25 and 25' is under sufficient positive pressure that the air therewithin is flushed out and prevented from leaking in.

Figure 3:
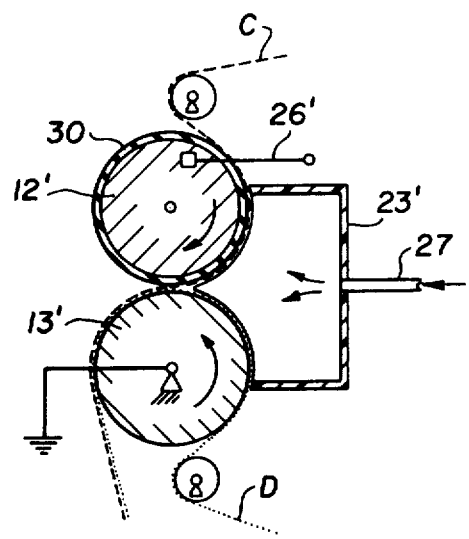
FIG. 3 is a similar view showing the apparatus with one of the feed rollers connected to the high voltage side of the power supply.

Another advantageous mode of operation is with one of the rollers which compresses the activated film connected as the high voltage electrode as shown in FIG. 3. In this instance roller 12', the upper roller, is indicated as being connected to the high voltage side of the source while roller 13' is grounded. It will be understood that roller 12' is fully insulated from its support structure and is insulated from roller 13' by an insulative sleeve 30. Such an arrangement is necessary when one of the component films being used to form the laminate is electrically conductive such as aluminum foil which must be fed on the grounded roller. In the arrangement shown in FIG. 1 if one of the components, say film A, were aluminum foil then substantially all of the discharge from electrode 25 would be to roller 12 and when, as illustrated, the apparatus is operated at atmospheric pressure, an arc would form which would be destructive to the aluminum foil.

In the arrangement shown in FIG. 3, the enclosure 23' need not contain any electrode structure but is required to confine a gaseous medium having a lower breakdown voltage characteristic than air because otherwise the discharge would tend to form on the output side as well as on the input side of the nip between the rollers 12' and 13'. Because of the much lower breakdown voltage of argon compared to air with both at atmospheric pressure, argon is highly advantageous for use because it tends to confine the discharge to the input side of the nip between the rollers where it is fed and maintained.

As shown in FIG. 1 but as modified in accordance with FIG. 3 so that the roller 12' (corresponding to roller 12 in FIG. 1) is connected by lead 26' to the high voltage side of the power supply while roller 13' (corresponding to roller 13) is grounded, it is evident that a metallic foil D fed over grounded roller 13' would not come into contact with heated roller 16 unless the activated plastic film C and foil D fed from roller 13' are passed about reversing roller 33 before being fed about roller 16. Of course, if roller 13' were connected to the high voltage side of the power supply and roller 12' grounded so that the metallic foil is fed in contact with the latter then it would not be necessary to reverse the films.

Unlike the product of U.S. Pat. No. 3,188,265, the present process produces a laminate in which the components are bonded to each other without the formation of an interfacial layer identifiable as such and distinguishable from each of the components. Apparently, in the present process, chemical linkages are formed across the interface between the juxtaposed surfaces of the components. It is a unique characteristic of the present process that the bond between the two components can be controlled by regulating the duration of their exposure to plasma activation, the plasma current, the temperature to which the activated components are heated, and how long they are heated. By controlling the process parameters, laminates having widely different lamination strengths can be provided to satisfy different requirements. For example, packages can be provided which require so much strength to tear them apart that they would not yield to the limited strength and dexterity of a small child. Food pouches are also provided in which the contents can be preserved but which when exposed to boiling water for the time required for cooking, say 5 minutes as in the case of some vegetables, can then easily be opened by hand. Thus, the process of the present invention lends itself to a high degree of controlled variation in bond strength when compared to conventional bonding techniques which utilize a wet adhesive or the dry lamination process of U.S. Pat. No. 3,188,265.

The following examples for making packaging film laminates are illustrative of the present invention.

EXAMPLE 1

Polyester film as film A and polyethylene film as film B were threaded through the apparatus shown in FIG. 1. The separate films were fed into the machine in the arrangement shown and taped together on the take-up roller 20. Drive roller 19 and take-up roller 20 were brought into engagement by swinging the take-up roller 20 against the drive roller 19, and then the latter was driven to pull the film through the apparatus at 2.0 ft/min. The heated roller 16 was warmed to a temperature of 350°F by the circulation of hot oil through conduits 31 and 32. Argon was admitted to the enclosure 23 at a rate of 5 liters per minute. The flow of argon was maintained long enough before initiation of the gas discharge to purge enclosure 23 of air. With a force of 300 lbs. applied to the rollers 12 and 13, with 150 lbs. applied to the heated roller 16 and backup roller 17, and with the films in motion, an alternating voltage, 3,000 Hz, was applied to electrode 25. When the potential of the electrode reached a voltage of about 700 volts relative to grounded rollers 12 and 13, a visible electric gas discharge was initiated. Raising the voltage to 1500 volts extended the visible plasma region along the width of both of the rollers 12 and 13 and back to about 4 inches before their point of contact. After ten minutes of running time (20 ft. of lamination) at 20 ma, the discharge was terminated and the films removed for inspection and testing.

It should be noted that rollers 12 and 13 were about 4 inches in diameter, roller 12 being about 10 inches in length and roller 13 about 12 inches in length. Rollers 16 and 17 were about 3½ inches in diameter and 12 inches in length. Rollers 19 and 20 were respectively 4 inches and 3 inches in diameter and both were 12 inches in length.

Before the gas discharge was turned on, a length of the film had been passed through the apparatus. Thus, unactivated portions of the films were subjected to compression by the rollers 12 and 13. They were heated by heated roller 16 and then pressed between rollers 16 and 17. However, those portions of the films which were not activated by the gas discharge showed no tendency to adhere to one another. On the other hand, the films that were activated by the argon plasma became bonded to one another to the extent that an attempt to separate them manually resulted in tearing of the polyethylene. There was no discoloration of the activated films and the laminate formed was clear and transparent.

Twelve pouches were prepared from the laminate, six containing methanol and containing methyl ethyl ketone (MEK). After 24 hours, the pouches were opened and found to be free of delamination. In none of the twelve pouches could the polyethylene component be separated from the polyester component. Strips one inch wide were cut to permit measurement of the peel strength of the polyethylene-to-polyethylene heat seal on a Scott Tester (Tensile Tester X-3) manufactured by Scott Testers, Inc., Providence, Rhode Island). The values obtained range from 13 to 16 lbs., indicating negligible solvent damage. Here and throughout this application, test strengths in pounds refers to pounds per inch of width (lbs/in width or lbs/in) perpendicular to the direction of the test force.

A number of pouches were made containing corn oil. These were also closed by heat sealing polyethylene-to-polyethylene surfaces. These pouches were immersed in boiling water. After a period of one hour, a period which is longer than that to which such pouches are subjected in normal use, none of the pouches had failed. In fact, the first one to fail did so after about 3 hours and 15 minutes. Examination of these pouches at that time showed that each had some areas of delamination, but none in the region where they were heat sealed.

EXAMPLE 2

A laminate of polyester with an ethylene-vinyl acetate copolymer (EVA) film (Dow Chemical Co., "ZENDEL" Copolymer) was prepared using the same apparatus and conditions described in connection with Example 1, except that in this instance the roller 12 was insulated from ground by using a phenolic plastic shaft and bearing, and covering it with a plastic sleeve as was described as roller 12' shown in FIG. 3. The thus insulated roller 12 was connected to the high voltage side of the power supply as was described in connection with FIG. 3. Roller 13 was grounded as before and electrode 25 was left unconnected. A discharge current of 15 ma was used to provide a satisfactory seal between the two components even though the luminous region of plasma extended only about 2 inches from the nip between rollers 12 and 13 back along the input side of the rollers. As in the case of Example 1, there was no discharge on the exit side (left as viewed in the drawings) of the rollers 12 and 13.

Six pouches were prepared filled with MEK by heat sealing the EVA surfaces. Two of the pouches were cut open after one day, and the heat seal was found to have an average peel strength of 15 lbs. as measured on the Scott Tester. After five days had passed, two more of the pouches were cut open and tested and were found to have an average peel strength of 11 lbs. When the last two pouches were tested after 27 days, they were found to have an average peel strength of 7 lbs.

One inch wide strips of the polyester-EVA laminate were doubled and heat sealed in such a way that a free lip of polyester could be pulled away from a second lip of the EVA reinforced by the polyester in order to permit measurement of the lamination peel strength. These specimens were prepared from laminate which had in turn been made by bonding a narrower strip of EVA to a wider strip of polyester. The peel strength of the laminate as measured by the Scott Tester was found to be about 3.3 lbs.

EXAMPLE 2A

A laminate of polyester and EVA was made as described in connection with Example 2 but instead of argon, an atmosphere of air was used which required a voltage of 4,000 V to maintain the discharge current of 15 milliamperes. The laminate thus prepared at a much higher cost in power had an average peel strength of 2.7 lbs and its properties did not differ significantly from the laminate of Example 2. Heat sealed pouches containing MEK when opened after 5 days gave an average peel strength of 8 lbs. Sealed pouches also filled with MEK were still intact when examined after 15 days but had come apart after 27 days. Reduction of the compression force from 300 lbs between rollers 12 and 13 and did not have a significant effect. During a portion of the run, those rollers were not pressed together and the corresponding part of the laminate had a peel strength of about 2.0 lbs.

EXAMPLE 2B

Laminate made as described in connection with Example 2 but with the drive speed raised to provide a feed rate of 45 feet per minute when tested had an average peel strength of 1.9 lbs. Pouches prepared from such laminate by heat sealing EVA-EVA surfaces, containing MEK remained intact at least 27 days.

EXAMPLE 3

Laminates were prepared as described in connection with Example 2 from polyethylene and polyester coated with Saran (Dow Chemical Co. Mylar A/X-2058). In all of these runs, the Saran faced the electric gas discharge and was the surface directly bonded to the polyethylene film. Except as noted in Table I for each of the Runs A–F, the same equipment and conditions were used as in Example 2.

TABLE I

| Run | Atm. | Heated Roller (°F) | Disch. Cur. (ma) | Strength (lbs/in) |
|---|---|---|---|---|
| A | argon | 350 | 20 | 4.5 |
| B | argon | 430 | 5 | 2.7 |
| C | argon* | 430 | 12 | 5.2 |
| D | argon | 430 | 20 | 9.2 |

TABLE I-continued

| Run | Atm. | Heated Roller (°F) | Disch. Cur. (ma) | Strength (lbs/in) |
|---|---|---|---|---|
| E | argon | 430 | 50 | 9.7 |
| F | air** | 430 | 12 | 6.5 |

*The voltage was 1400 V instead of 1500 V
**The voltage was 3000 V for Run F in air The data shows that substantially maximum activation of the surfaces to be bonded occurred under the conditions stated with the discharge current of 20 ma, as is evident from the fact that increasing the current more than two times to 50 ma only had the effect of increasing the average peel strength from 9.2 to 9.7 lbs. On the other hand, the laminate strength was doubled by raising the temperature of the heated roller 16 from 350°F to 430°F.

Under the conditions of Run D but with the feed rate increased to 44 feet per minute, the laminate of polyester/Saran-polyethylene had an average peel strength of 2.5 lbs. This represents a substantial increase in efficiency and provides a product-to-power-consumed ratio for experimental equipment of about $10^4 ft^2/kWh$ or 6 watt minutes/$ft^2$.

Under the conditions stated for Run D, it was found that when air was evacuated from the system and the discharge was in argon, peel strengths of 10.6 lbs were obtained for laminates prepared at 20 ma and with a feed rate of 2 ft/min.

Six pouches were made by heat sealing laminates produced in accordance with this example and containing methanol. After 1 day, one of the pouches was tested and had a heat seal strength of 13.0 lbs. After the 2nd day the second pouch tested had a strength of 14.7 lbs. After the 3rd day, the third pouch had a test strength of 12.5 lbs. After the 5th day, the fourth pouch had a test strength of 11.0 lbs. After 7 days, the fifth pouch was found to be delaminated but the sixth pouch was still intact.

It should also be noted that polyester film coated with Saran can be used to make a laminate in which the back or uncoated surface of the polyester is bonded to the thermoplastic component of the laminate. In an additional run to those described and with a feed rate of 44 ft/min, the Saran coated polyester film was bonded to polyethylene with the Saran coated surface out and the bond formed between the polyester and the polyethylene films. This was accomplished without any damage to the Saran coating and without its adhering to the heated roller 16 with which it made contact.

EXAMPLE 4

A laminate was made from cellophane and polyethylene films as described in Example 2. The heated roller was maintained at 300°F because of the sensitivity of the films to heat. The force between rollers 16 and 17 was 150 lbs and the current was 30 ma. Runs were made at 0.5 ft/min, 2 ft/min and 47 ft/min. The laminates prepared gave average peel strength respectively of 3.9 lbs, 3.3 lbs, and 0.9 lbs.

As packaging material such laminates are not suitable for packaging food or organic liquids, but they can be used for packaging hardware, hard candy and other materials which are not oily. An advantage of this laminate resides in the fact that it can be heat sealed while cellophane alone cannot be heat sealed to itself and, therefore, cannot be used where heat sealing is required even though it has highly desirable strength and appearance.

EXAMPLE 5

A laminate of polyester/Saran and EVA was made as was described in Example 1, except that the current was maintained at 15 ma, heated roller 16 operated at a temperature of 260°F and the force between it and backup roller 17 was 90 lbs. The laminate thus produced had an average peel strength of 1.2 lbs.

Raising the temperature of roller 16 to 300°F and the force between it and roller 17 to 150 lbs. increased the bond strength to an average of 10.1 lbs. When the polyester/Saran-EVA was laminated under these conditions but with the gas discharge in air instead of argon, the bond produced did not resist manual separation.

EXAMPLE 6

Lamination of polyester film to polyethylene film was carried out as described in connection with Example 2 with the discharge current ranging from 15 to 20 ma. The feed rate and atmosphere were varied as indicated in Table II where the peel test bond strengths are also indicated.

TABLE II

| Run | Atm. | Ft/min | Strength (lbs/in) |
|-----|------|--------|-------------------|
| A | argon | 2 | 2.3 |
| B | argon | 48 | 1.2 |
| C | air | 2 | 2.9 |
| D | air | 2 | 2.0 |

It should also be noted for Run D there was no force applied between rollers 12 and 13.

Heat sealed pouches prepared from the laminates of Example 6, containing MEK and heat sealed by bonding the polyethylene surfaces together, appeared quite stable and capable of resisting damage from the MEK indefinitely. Similar pouches prepared from the laminate of Run A containing methanol were intact after five days but failed in seven days. Those prepared from the laminate of Run C and also containing methanol were intact after two days but failed in three days.

In contrast to these results, attempts to bond polyester and polyethylene films which had not been activated by the gas discharge plasma were unsuccessful even when extreme conditions of heat and pressure were used.

EXAMPLE 7

Five runs were carried out as described in connection with Example 2, bonding polyester to EVA using a 9 inch wide film of polyester and a 6 inch wide film of EVA. The temperature of the heated roller 16 was maintained at 430°F and the feed rate was 2 ft/min. The variations from run to run in atmosphere, voltage and current were as indicated in Table III where the peel strengths are also indicated in pounds per inch of width.

TABLE III

| Run | Atm. | Voltage (KV) | Cur. (ma) | Strength (lbs/in) |
|-----|------|--------------|-----------|-------------------|
| A | argon | 1.3 | 5 | 2.4 |
| B | argon | 2.0 | 20 | 5.7 |
| C | argon | 3.0 | 50 | 6.0 |
| D | argon | 5.5 | 125 | 6.3 |

TABLE III-continued

| Run | Atm. | Voltage (KV) | Cur. (ma) | Strength (lbs/in) |
|-----|------|--------------|-----------|-------------------|
| E | air | 3.9 | 15 | 2.3 |

It is evident that increasing the discharge current above 20 ma to 50 or as much as 125 ma results in only a small increase in the peel strength of the laminate. It is also apparent that carrying out the process in air is less efficient than in argon. The power requirements for Run A amounted to about 6.5 watt minutes per square foot.

EXAMPLE 8

A laminate was prepared by feeding polyethylene film from roller 10 and aluminum foil from roller 11 using the arrangement as described in connection with Example 2 so that the aluminum foil was wrapped about the grounded roller 13. Before passing the activated components around the heated roller 16, they were passed about the reversing roller 33 so that the aluminum foil side came in contact with the heated roller 16. After start up with a feed rate of 2 ft/min, with the force between the rollers 12 and 13 at 100 lbs. and between the roller 16 and 17 at 50 lbs., and with the temperature of heated roller 16 at 300°F, a discharge in air was initiated at about 1,200 volts and the voltage was gradually increased to 1,700 volts at which point the discharge current was 50 ma. After eight minutes or about 16 feet of total feed, the run was discontinued and the treated material was removed from the take-up roller 20.

It was found that the portion of the components that were not activated by the discharge had no adhesion between them. This changed sharply at the point where the discharge treatment commenced. Thereafter, for the first one to two inches, the components could be separated by hand only with increasing difficulty, and then, beyond that, the polyethylene stretched and tore before any de-lamination could be carried out. At the end of the run, where the discharge was turned off before the feeding of the components was stopped, the loss of adhesion was equally abrupt.

The bond formed between the components of this laminate extended entirely across the 9 inch width of the two materials. It was also noted that when the temperature of the heated roller 16 was lowered or when the feed rate was increased, the aluminum-polyethylene bond could be weakened to any desired level. For example with the heated roller 16 at a temperature of 225°F, a laminate was prepared as just described in connection with Example 8 which could be peeled apart by hand with about the same effort required to remove masking tape from its roll (estimated at about 0.2–0.4 lbs/in width).

The polyethylene film used in carrying out Examples 1, 3, 4, 6, and 8 was that commercially available and such film usually has a corona treated side. Such a low level of activation which would result from a corona discharge was found to be of no significance. The polyethylene could be oriented with either its corona treated side or its back surface to the material with which it was being laminated without affecting the results. Nevertheless, it is preferred in making laminates using such polyethylene that such sites as may remain activated as a result of the prior commercial corona discharge treatment be buried within the laminate, and the previously unirradiated surface be left exposed in order to best preserve the heat sealing properties of the polyethylene side of the laminate.

While various embodiments of the present process and of the products prepared thereby have been described as well as of the apparatus for carrying out the process, further variations thereof within the scope of the claims will be apparent to those skilled in this art. In addition, further uses of the product produced by the process of the present invention will also be apparent to those skilled in this art. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for bonding shaped members, at least one of which is formed from a thermoplastic resin, comprising the steps of: exposing the surfaces to be bonded to the low energy particles of a gas discharge plasma while bringing said surfaces together in face-to-face contact and until they contact, terminating the exposure to said plasma by pressing the surfaces together; heating the members; and pressing the heated members together.

2. A process as in claim 1 wherein the shaped members are in the form of extended sheets.

3. A process as in claim 1 wherein the thermoplastic resin is a material selected from the group consisting of polyethylene and ethylene-vinyl acetate copolymer.

4. A process as in claim 1 wherein said gas is selected from the group consisting of helium, argon and nitrogen.

5. A process as in claim 4 wherein the shaped members are in the form of extended sheets and the thermoplastic resin is a material selected from the group consisting of polyethylene and ethylene-vinyl acetate copolymer.

6. A process as in claim 5 wherein the gas is argon.

7. A process as in claim 6 wherein the thermoplastic resin is polyethylene.

8. A process as in claim 7 wherein the polyethylene sheet is bonded to a polyester sheet.

9. A process as in claim 7 wherein the polyethylene sheet is bonded to an aluminum foil sheet.

10. The bonded article produced by the process of claim 1.

11. The bonded article produced by the process of claim 5.

12. The bonded article produced by the process of claim 7.

13. The bonded article produced by the process of claim 8.

14. The bonded article produced by the process of claim 9.

15. A dry lamination process for bonding two extruded sheets having different melting points, at least one of which is formed from a thermoplastic resin, comprising the steps of: exposing the surfaces to be bonded to the low energy, less than 15 eV, particles of a gas discharge plasma while bringing said surfaces together in face-to-face contact and until they contact, terminatng the exposure to said plasma by pressing the surfaces together; heating the pressed-together sheets to a temperature which is lower than the melting point of the sheet formed of the lower melting component, during which only the sheet formed of the higher melting component is in contact with the heat source; and further compressing the heated sheets thus bonding the sheets into a laminate.

16. The process of claim 15 wherein the discharge voltage is about 700 to 10,000 volts.

17. The process of claim 16 wherein the discharge current in the area of the materials covered by the gas discharge plasma is about 0.1 to 10 milliamperes per square inch.

18. The process of claim 17 wherein said discharge current is about 0.3 to 3 milliamperes per square inch.

19. The process of claim 18 wherein the gas is argon.

20. The process of claim 19 wherein one sheet is formed from polyethylene and the other from polyester.

21. The process of claim 19 wherein one sheet is formed from polyethylene and the other is aluminum foil.

22. The laminate formed by the process of claim 15.

23. The laminate formed by the process of claim 20.

24. The laminate formed by the process of claim 21.

25. An apparatus for bonding shaped members, at least one of which is formed from a thermoplastic resin, comprising: means for feeding said shaped members along a predetermined path; a first pair of juxtaposed compression rollers on opposite sides of said path defining a nip to press the shaped members together; means for exposing the surfaces of the shaped members to be bonded to the low energy particles of a gas discharge plasma just before and until the shaped members are brought together in face-to-face contact by said first compression rollers; a second pair of juxtaposed compression rollers at least one of which is heated, on opposite sides of said path after said first rollers, to heat and further press the shaped members together.

26. An apparatus as in claim 25 wherein only one of the second pair of compression rollers is heated.

27. An apparatus as in claim 26 further comprising means for guiding the shaped members so that only the member composed of the higher melting component comes in contact with the heated roller.

28. An apparatus as in claim 25 wherein the exposing means comprises an enclosure composed of insulative material on the input side of the first pair of compression rollers which closely conforms to the curvature of said first rollers so as to confine the gas of the gas discharge plasma within the space defined by the enclosure and said first rollers; means to feed said gas into the enclosure; an electrode mounted within the enclosure which is connected to the high voltage side of a variable power supply; and means for electrically grounding said first rollers so that an electric discharge can pass between the electrode and said grounded rollers.

29. An apparatus as in claim 28 wherein the electrode comprises an extended body positioned longitudinally parallel to and spaced from said grounded rollers.

30. An apparatus as in claim 29 wherein the sides of the electrode presented toward the grounded rollers are concave so as to conform to the curvature of the grounded rollers so that the electrode is uniformly spaced from the grounded rollers.

31. An apparatus as in claim 29 wherein the sides of the electrode presented toward the grounded rollers are concave such that the space between the electrode and the grounded rollers increases in the direction away from the nip of the grounded rollers.

32. An apparatus as in claim 25 wherein the exposing means comprises means for electrically grounding the first compression rollers; an electrode formed as an extended hollow body positioned longitudinally parallel to said grounded rollers with a slot formed longitudinally in the electrode providing communication between its interior and the nip of the grounded rollers to which the slot is closely juxtaposed; means for feeding the gas of the gas discharge plasma into the interior of the electrode; insulative end flaps mounted at the ends of the electrode to prevent the gas from exiting the electrode at its ends; and means for connecting the electrode to the high voltage side of a variable power supply such that the gas flows through the interior of the electrode and exits through the slot and an electric discharge passes between the electrode and the grounded rollers.

33. An apparatus as in claim 32 wherein the sides of the electrode presented toward the grounded rollers are concave so as to conform to the curvature of the grounded rollers so that the electrode is uniformly spaced from the grounded rollers.

34. An apparatus as in claim 32 wherein the sides of the electrode presented toward the grounded rollers are concave such that the space between the electrode and the grounded rollers increases in the direction away from the nip of the grounded rollers.

35. An apparatus as in claim 25 wherein the exposing means comprises means for connecting one of the first pair of compression rollers to the high voltage side of a variable power supply; means for grounding the other of the first pair of compression rollers; an enclosure composed of insulative material positioned on the input side of the first pair of compression rollers which closely conforms to the curvature of said first rollers so as to confine the gas of the gas discharge plasma within the space defined by the enclosure and the sides of said first rollers, said gas having a lower breakdown voltage than air.

36. An apparatus as in claim 35 wherein the gas is argon.

37. An apparatus as in claim 36 wherein one shaped member comprises aluminum foil, said aluminum foil member being fed through the first rollers so that it only contacts the grounded roller.

38. An apparatus as in claim 37 wherein only one of the second pair of compression rollers is heated and wherein only the aluminum foil contacts said heater roller.

39. An apparatus for bonding shaped members, at least one of which is formed from a thermoplastic resin, comprising: means for exposing the surfaces of the shaped members to be bonded to low energy particles of a gas discharge plasma, means for bringing said surfaces together in face-to-face contact while exposed to said plasma and pressing them together to terminate the exposure to said plasma; means for heating said members; and means for pressing said heated members together.

* * * * *